United States Patent
Broekman et al.

(10) Patent No.: US 11,903,104 B2
(45) Date of Patent: Feb. 13, 2024

(54) CONTROLLER FOR CONTROLLING A PLURALITY OF LIGHTING UNITS OF A LIGHTING SYSTEM AND A METHOD THEREOF

(71) Applicant: SIGNIFY HOLDING B.V., Eindhoven (NL)

(72) Inventors: Paul Ulco Broekman, Eindhoven (NL); Simone Maria Stavenuiter, Geldrop (NL); Simon Rycroft, Eindhoven (NL)

(73) Assignee: SIGNIFY HOLDING B.V., Eindhoven (NL)

( * ) Notice: Subject to any disclaimer, the term of this patent is extended or adjusted under 35 U.S.C. 154(b) by 227 days.

(21) Appl. No.: 17/609,805

(22) PCT Filed: May 4, 2020

(86) PCT No.: PCT/EP2020/062254
§ 371 (c)(1),
(2) Date: Nov. 9, 2021

(87) PCT Pub. No.: WO2020/229207
PCT Pub. Date: Nov. 19, 2020

(65) Prior Publication Data
US 2022/0312558 A1    Sep. 29, 2022

(30) Foreign Application Priority Data
May 15, 2019 (EP) .................. 19174675

(51) Int. Cl.
*H05B 45/10* (2020.01)
*H05B 47/155* (2020.01)
*H05B 45/3577* (2020.01)

(52) U.S. Cl.
CPC ......... *H05B 45/10* (2020.01); *H05B 45/3577* (2020.01); *H05B 47/155* (2020.01)

(58) Field of Classification Search
CPC ................ H05B 45/10; H05B 45/3577; H05B 47/155; H05B 47/175; Y02B 20/40
See application file for complete search history.

(56) References Cited

U.S. PATENT DOCUMENTS

| | | |
|---|---|---|
| 10,299,337 B1 * | 5/2019 | Chen ...................... H05B 45/44 |
| 2006/0167572 A1 | 7/2006 | Fluss |
| 2011/0112691 A1 | 5/2011 | Engelen |

(Continued)

FOREIGN PATENT DOCUMENTS

| | | |
|---|---|---|
| CN | 101553065 A | 10/2009 |
| CN | 202009528 U | 10/2011 |

(Continued)

OTHER PUBLICATIONS

XP055068518: User Guide: "ColorPlay 3 Version 1.11", dated Jan. 1, 2011, retrieved from the Internet (URL: http://www.colorkinetics.com/support/userGuides/ColorPlay_3_User_Guide.pdf).

(Continued)

*Primary Examiner* — Abdullah A Riyami
*Assistant Examiner* — Syed M Kaiser

(57) ABSTRACT

A method (400) of controlling a plurality of lighting units (112, 114) of a lighting system (100) is disclosed. The method (400) comprises receiving (402) a first input indicative of that a light scene of a first type has been activated, receiving (404) a second input indicative of a dimming command for the plurality of lighting units (112, 114), obtaining (406) data indicative of functions of the plurality of lighting units (112, 114), wherein a first lighting unit (112) has a first function to provide ambient lighting and a second lighting unit (114) has a second function to provide functional lighting, and, if the light scene of the first type is active, controlling (408) the first lighting unit (112) based on the dimming command according to a first dimming profile, wherein the first dimming profile for the first lighting unit (112) is based on the first function, and simultaneously (Continued)

controlling (408) the second lighting unit (114) based on the dimming command according to a second dimming profile different from the first profile, wherein the second dimming profile for the second lighting unit (114) is based on the second function.

14 Claims, 4 Drawing Sheets

(56) References Cited

U.S. PATENT DOCUMENTS

| | | | |
|---|---|---|---|
| 2015/0288453 A1* | 10/2015 | Jung | H04B 10/80 398/106 |
| 2016/0128155 A1 | 5/2016 | Petluri et al. | |
| 2017/0295624 A1 | 10/2017 | Lark, Jr. et al. | |
| 2018/0048388 A1* | 2/2018 | Lee | H04B 10/502 |

FOREIGN PATENT DOCUMENTS

| | | | |
|---|---|---|---|
| CN | 108135063 A | 6/2018 | |
| WO | 2010004488 A1 | 1/2010 | |
| WO | WO-2010004488 A1 * | 1/2010 | ............ H05B 37/02 |
| WO | 2014115048 A1 | 7/2014 | |
| WO | 2018001782 A1 | 1/2018 | |

OTHER PUBLICATIONS

Wei, et al., "China Illuminating Engineering Journal", No. 2, Apr. 15, 2019, pp. 116-124.

LeLe and Liu Lin Design and Implementation of MCU-based Stage Lighting Control enter: Design and Implementation of System Control Software, Science & Technology Economy Market, No. 5, May 15, 2007, pp. 44-46.

* cited by examiner

CONTROLLER FOR CONTROLLING A PLURALITY OF LIGHTING UNITS OF A LIGHTING SYSTEM AND A METHOD THEREOF

CROSS-REFERENCE TO PRIOR APPLICATIONS

This application is the U.S. National Phase application under 35 U.S.C. § 371 of International Application No. PCT/EP2020/062254, filed on May 4, 2020, which claims the benefit of European Patent Application No. 19174675.9, filed on May 15, 2019. These applications are hereby incorporated by reference herein.

FIELD OF THE INVENTION

The invention relates to a method of controlling a plurality of lighting units of a lighting system and to a computer program for executing the method. The invention further relates to a controller for controlling a plurality of lighting units of a lighting system.

BACKGROUND

Smart lighting systems may comprise multiple lighting units and lighting control devices (such as light switches and smartphones) that are connected via a network. These lighting control devices enable users to control the light output of the lighting units, for example by selecting colors and intensity levels for the lighting units. Additionally, lighting units may be controlled by other devices connected to the network (e.g. by auxiliary devices such as TVs, game consoles, pcs, etc.), or the lighting units may be controlled based on pre-programmed routines.

WO 2014/115048 A1 discloses a luminaire comprising a first light source issuing a first beam and a second light source issuing a second beam. Said first and said second light source are dimmable and together issue light with a total light flux. The luminaire further comprises at least one (programmed) controller which, during operation, moderates said dim levels such that in at least a range of the illumination level a ratio of the dim level of the second beam to the dim level of the first beam increases in a gradual manner with increasing total light flux. The luminaire includes at least two light sources, i.e. a direct, reading light as a first light source and an uplighter, indirect light as a second light source. The luminaire comprises as a first control part a first user interface which enables controlling of the amount of light (light level) and as a second control part a second user interface which enables setting of the desired ratio of indirect/direct lighting for distribution of light on the book and in the room.

If a lower light intensity level is required, a user or a device may dim the light output of the lighting units. Typically, the light output of all lighting units is reduced based on a received dimming command. Such control may not always have the desired effect on the lighting atmosphere in the room/space wherein the lighting system is installed.

SUMMARY OF THE INVENTION

Typically, if multiple lighting units are dimmed together, all lighting units are dimmed according to the same dimming curve. The inventors have realized that dimming all lighting units according to the same dimming curve may not have the desired effect on the lighting atmosphere in the room/space wherein the lighting system is installed, especially when a user has different types of lighting units installed in his or her room. It is an object of the present invention to provide a lighting system that provides an improved lighting atmosphere in the room/space when the light is dimmed.

According to a first aspect of the present invention, the object is achieved by a method of controlling a plurality of lighting units of a lighting system, the method comprising:
receiving a first input indicative of that a light scene of a first type has been activated,
receiving a second input indicative of a dimming command for the plurality of lighting units,
obtaining data indicative of functions of the plurality of lighting units, wherein a first lighting unit has a first function to provide ambient lighting and a second lighting unit has a second function to provide functional lighting, and, if the light scene of the first type is active,
controlling the first lighting unit based on the dimming command according to a first dimming profile, wherein the first dimming profile for the first lighting unit is based on the first function, and simultaneously
controlling the second lighting unit based on the dimming command according to a second dimming profile different from the first profile, wherein the second dimming profile for the second lighting unit is based on the second function.

The first and second lighting units are dimmed based on dimming profiles that are associated with their function. The function of the first lighting unit is to provide ambient lighting, the function of the second lighting unit is to provide functional lighting. Thus, the first dimming profile is a dimming profile for an ambient lighting unit, and the second dimming profile is a dimming profile for a functional lighting unit. The lighting units are controlled based on a dimming command (which may, for example, be received from a user, a pre-programmed routine, a further device, etc.) and based on their respective dimming profiles if the light scene (based on which the lighting units that are controlled) is active. In other words, the control of the lighting units according to the specific dimming profiles is (only) executed if the specific light scene is activated. It may be desirable that for other light scenes the dimming profiles of the lighting units are different (they may for instance have the same dimming profile for certain light scenes). The dimming profiles may thus be dependent on the selected light scene (e.g. a set of light settings for the plurality of lighting units). Dimming the light output of the lighting units based on their function in the scene is beneficial, because it provides an improved lighting atmosphere in the room/space when the light is dimmed. An additional benefit is that, when the intensity of the light output of the lighting units is increased, the functional light may become more dominant relative to the ambient light, thereby improving the functional lighting in the environment, and therewith also the efficiency of a user performing a functional task (e.g. cooking, reading, working, etc.).

If the light scene of the first type is not active, the method may further comprise the step of controlling the first and second lighting units simultaneously based on the dimming command according to a third dimming profile. In this example, both the first and the second lighting unit are controlled according to the same (third) dimming profile. The third dimming profile may be a predefined or default dimming profile. The third dimming profile may be different from the first and the second dimming profile. This is beneficial for some scenes, because it may be desirable for certain scenes that the total light output of all lighting units is dimmed substantially similarly.

The first and second dimming profiles may be based on a function of the light scene. The method may comprise the step of determining/obtaining the function of the light scene, and determining the first and second dimming profiles based on the function of the light scene.

When the function of the light scene is to provide ambient lighting, the second dimming profile may have an at least partially steeper dimming curve than the first dimming profile. In other words, the first dimming profile may have a first dimming curve, and the second dimming profile may have a second dimming curve, such that when the lighting units are controlled based on the dimming command, the light output of the second lighting unit reduces relatively more with respect to the light output of the first lighting unit. This may be beneficial, because it may be desirable for an ambient lighting atmosphere that the ambient lighting characteristics (often colored) are more prominent compared to the functional lighting characteristics (often white light).

When the function of the light scene is to provide functional lighting, the first dimming profile may have an at least partially steeper dimming curve than the second dimming profile. In other words, the first dimming profile may have a first dimming curve, and the second dimming profile may have a second dimming curve, such that when the lighting units are controlled based on the dimming command, the light output of the first lighting unit reduces relatively more with respect to the light output of the second lighting unit. This may be beneficial, because it may be desirable for a functional lighting atmosphere that the ambient lighting characteristics (often colored) are less prominent compared to the functional lighting characteristics (often white light).

The first and second dimming profiles may be such that the intensity of the second lighting unit is lower than the intensity of the first lighting unit for a first part of the dimming profiles for dimming settings below a threshold value, and the intensity of the second lighting unit is higher than the intensity of the first lighting unit for a second part of the dimming profiles for dimming settings above the threshold value, or vice versa.

The second input may be indicative of a user input received via a user input device. The user input may, for example, be received from the user input device (e.g. a light switch, a personal device such as a smartphone, etc.).

The respective functions of the lighting units may be defined by the light rendering capabilities of the respective lighting units. The light rendering capabilities may be received, and the functions of the lighting units may be determined based thereon. The first lighting unit may, for example, comprise light sources configured to emit colored light, whereas the second lighting unit may comprise light sources configured to emit white light or white light with different color temperatures. Based thereon, the ambient function of the first lighting unit and the functional function of the second lighting unit may be determined.

The respective functions of the lighting units may be defined by the light scene. The light scene may, for example, comprise information (e.g. metadata) indicative of the functions of the lighting units that are controlled according to the light scene. This information may be obtained, and the function of the lighting units may be determined based thereon.

The light scene may have been selected based on a detected user activity. The user activity may, for example, be detected based on that the user is operating a specific device, e.g. a media rendering device (e.g. a TV, a game console, a smartphone, etc.), or that the user is running a software application. Additionally or alternatively, the user activity may be detected by a sensor, such as a camera, a motion sensor, one or more RF sensors, etc.

The first and second dimming profiles may be based on positions of the first and second lighting units. The dimming profiles may, for example, be determined based on the relative positions of the lighting units. Additionally or alternatively, the dimming profiles may be determined as a function of the distance between the first and the second lighting units. If, for example, the distance between the lighting units is smaller, the first and second dimming curves may be more similar, whereas if the distance between the lighting units is larger, the first and second dimming curves may be more distinct.

Additionally or alternatively, the first and second dimming profiles may be based on positions of the first and second lighting units relative to a device, preferably a media rendering device (e.g. a TV, a game console, a smartphone, etc.). The position of the device and the lighting units may, for example, be obtained from an (indoor) positioning system. The dimming profiles may be determined as a function of the distance between the respective lighting units and the device. If, for example, the distance between a lighting unit and the device is smaller, the dimming curve may be steeper, whereas if the distance between a lighting unit and the device is larger, the dimming curve may be less steep (or vice versa).

Additionally or alternatively, the first and second dimming profiles may be based on positions of the first and second lighting units relative to a user. The position of the user and the lighting units may, for example, be obtained from an (indoor) positioning system. The dimming profiles may be determined as a function of the distance between the respective lighting units and the user. If, for example, the distance between a lighting unit and the user is smaller, the dimming curve may be steeper, whereas if the distance between a lighting unit and the user is larger, the dimming curve may be less steep (or vice versa).

According to a second aspect of the present invention, the object is achieved by a computer program product for a computing device, the computer program product comprising computer program code to perform any of the above-mentioned methods when the computer program product is run on a processing unit of the computing device.

According to a third aspect of the present invention, the object is achieved by a controller for controlling a plurality of lighting units of a lighting system, the controller comprising:
 a communication module configured to receive a first input indicative of that a light scene of a first type has been activated, and receive a second input indicative of a dimming command for the plurality of lighting units,
 a processor configured to obtain data indicative of functions of the plurality of lighting units, wherein a first lighting unit has a first function to provide ambient lighting and a second lighting unit has a second function to provide functional lighting, and, if the light scene of the first type is active, control the first lighting unit based on the dimming command according to a first dimming profile, wherein the first dimming profile for the first lighting unit is based on the first function and simultaneously control the second lighting unit based on the dimming command according to a second dimming profile different from the first profile, wherein the second dimming profile for the second lighting unit is based on the second function.

It should be understood that the computer program product and the controller may have similar and/or identical embodiments and advantages as the above-mentioned methods.

BRIEF DESCRIPTION OF THE DRAWINGS

The above, as well as additional objects, features and advantages of the disclosed systems, devices and methods will be better understood through the following illustrative and non-limiting detailed description of embodiments of devices and methods, with reference to the appended drawings, in which.

All the figures are schematic, not necessarily to scale, and generally only show parts which are necessary in order to elucidate the invention, wherein other parts may be omitted or merely suggested.

DETAILED DESCRIPTION OF EMBODIMENTS

Figure 1:
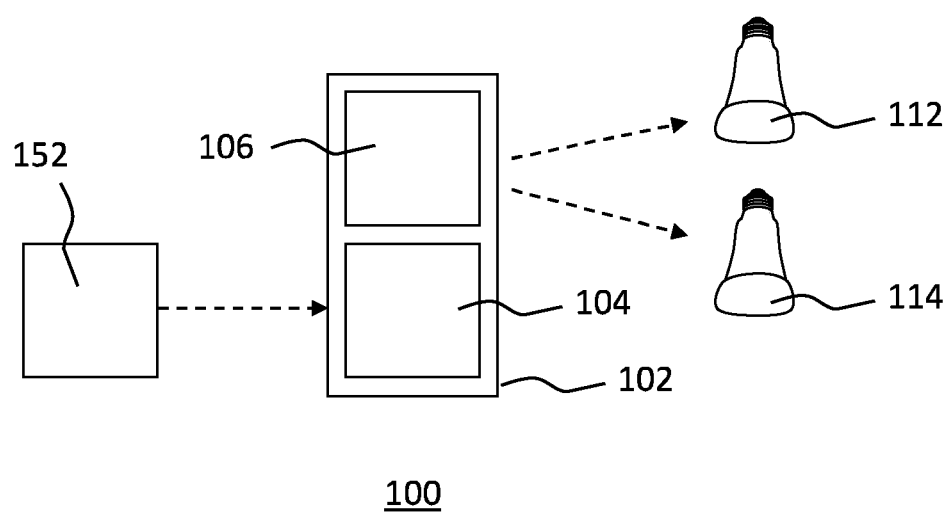
FIG. 1 shows schematically an embodiment of a lighting system comprising a controller for controlling a plurality of lighting units according to dimming profiles.

FIG. 1 illustrates a lighting system 100 comprising a controller 102 configured to control a plurality of lighting units 112, 114. The controller 102 may be located in the same environment wherein the lighting units 112, 114 are located. The controller 102 may, for example, be comprised in a hub, a bridge or another central controller of the lighting system. In other examples, the controller 102 may be comprised in a personal user device such as a pc, a smartphone, a tablet pc, a wearable device, etc. Alternatively, the controller 102 may be comprised in a remote server, which may communicate with the lighting units 112, 114 via a network such as the internet. Alternatively, the controller 102 may be comprised in a lighting unit 112, 114. The location of the controller 102 may depend on the system architecture of the lighting system 100.

The controller 102 comprises a communication module 104 configured to receive a first input indicative of that a light scene of a first type has been activated and a second input indicative of a dimming command for the plurality of lighting units 112, 114. The communication module 104 may be configured to communicate with devices 152 via a network (e.g. a LAN, WLAN, the internet, etc.). The communication module 104 may receive the input indicative of that the light scene has been activated from one or more devices 152, for example, a light switch or a smartphone, a media rendering device such as a TV or a game computer, an application running on a central control device (e.g. a bridge, a central (home) controller, etc.), etc. The communication module 104 may receive the second input indicative of the dimming command from one or more devices 152, e.g. a user input device such as a light switch or a smartphone, a media rendering device such as a TV or a game computer, an application running on a central control device (e.g. a bridge, a central (home) controller, etc.), etc. The communication unit 104 may receive the first and second inputs from the same device 152, or from different devices 152. The communication module 104 may be a transceiver, further configured to communicate with devices such as the lighting units 112, 114.

The communication module 104 may comprise a transmitter or a transceiver. The communication module 104 may be configured to communicate lighting control instructions to the lighting units 112, 114. The lighting control instructions may relate to one or more light settings, which may for instance be defined as RGB/HSL/HSB color values, CIE color values, intensity (brightness) values, beam angle/shape values, location values, etc. The lighting control setting may be communicated (e.g. as a message) to the lighting units 112, 114 in order to control the lighting units 112, 114. Various wired and wireless communication protocols may be used, for example Ethernet, DMX, DALI, USB, Bluetooth, Wi-Fi, Li-Fi, 3G, 4G, 5G or ZigBee. A specific communication technology may be selected based on the communication capabilities of the lighting units 112, 114, the power consumption of the communication driver for the (wireless) communication technology and/or the communication range of the signals. If the controller 102 is comprised in a remote server, the controller 102 may be configured to control the lighting units 112, 114 via an intermediary device such as a bridge, a hub, a central (home) lighting control system, a smartphone, etc. This may depend on the system architecture of the lighting system 100.

The dimming command may comprise control instructions for dimming the first and the second lighting units 112, 114. The dimming command may be an instruction to set the light output to a dimming setting (e.g. an absolute intensity (e.g. 50% of maximum intensity) or a relative intensity (e.g. 50% of current intensity)). A user may, for example, use a user input device to dim the lighting units 112, 114. The user input device may, for example, be a light switch comprising one or more buttons (e.g. a rotary dial, press/touch buttons, etc.) for receiving user input indicative of the dimming command. The user input device may, for example, be a smartphone, and the user may provide a touch input via a touch screen of the smartphone. The user input device may, for example, be a voice assistant (e.g. a smartphone, a smart home assistant, etc.) configured to receive a voice command indicative of the dimming command.

The controller 102 further comprises a processor 106 (e.g. a microcontroller, circuitry, etc.). The processor 106 is configured to obtain data indicative of functions of the plurality of lighting units, wherein a first lighting unit 112 has a first function to provide ambient lighting and a second lighting unit 114 has a second function to provide functional lighting. The data may be obtained via the communication module 104 from, for example, the lighting units 112, 114, a central (home) controller, a remote server, etc. The data may be obtained from a memory, which may be located remotely or in the controller 102.

The processor 106 may be further configured to determine if the light scene of the first type is (still) active. The light scene may be of a specific type. The light scene may be a dynamic light scene (wherein the light output of the lighting units 112, 114 changes over time) or a static light scene. The light scene may, for example, be an ambient light scene or a functional light scene. In an ambient light scene, ambient light (e.g. colors, gradients, dynamics (i.e. light effects that change over time), etc.) in the environment has a higher priority, whereas in a functional light scene functional light (e.g. high intensity (white) light, no or little dynamics) has a higher priority. A user may select a type of light scene based on his or her needs. Alternatively, the type of light scene may be selected automatically, e.g. by a media rendering device or by a pre-programmed routine. Each light scene may be associated with a function. The function of the light scene may be pre-programmed and stored in a memory. Alternatively, the function of the light scene may be derived from light settings of the light scene, for example by the processor 106. A light scene may for example comprise high intensity white light settings, which may be indicative of that the light scene is a functional light scene. A light scene may for example comprise (dynamic) color light settings, which may be indicative of that the light scene is an ambient light scene. Alternatively, the function of the light scene may be derived by the processor 106 from a name of the light scene. A light scene may be named "concentrate", indicating that the light scene is a functional light scene. A light scene may be named "relax", indicating that the light scene is an ambient light scene.

The processor 106 is configured to, if the light scene of the first type is active, control the first lighting unit 112 based on the dimming command according to a first dimming profile, wherein the first dimming profile for the first lighting unit 112 is based on the first (ambient) function and simultaneously control the second lighting unit 114 based on the dimming command according to a second dimming profile different from the first profile, wherein the second dimming profile for the second lighting unit 114 is based on the second (functional) function. The dimming profiles may be predetermined and associated with respective functions of the lighting units. The associations may be stored in a memory, and the processor 106 may be configured to access the memory to obtain the dimming profiles. Additionally or alternatively, the processor 106 may be configured to generate/adjust/determine the dimming profiles (see examples below).

If the processor 106 determines that the light scene of the first type is not active, but that a different light scene of a second (different) type is active (e.g. a light scene of another type, or a light scene without a type), the processor 106 may be configured to select or determine dimming profiles based on the different light scene. The second type of light scene is of a different type than the first type of light scene. Examples of types of light scenes include but are not limited to functional light scenes, ambient light scenes, entertainment light scenes (e.g. light scenes based on media content such as audio or video), emergency light scenes, go-to-sleep or wake-up light scenes, etc. In embodiments, the processor 106 may be configured to control the first and second lighting units 112, 114 simultaneously based on the dimming command according to a third dimming profile. In this example, both the first and the second lighting unit are controlled according to the same (third) dimming profile. The third dimming profile may be a predefined or default dimming profile. The third dimming profile may be associated with the type of the light scene. The third dimming profile may be obtained by the processor 106 from a (local or remote) memory.

The processor 106 may be further configured to determine the first and second dimming profiles based on a function or the type of the light scene. If the function of the light scene is to provide ambient lighting (e.g. entertainment lighting that matches content rendered on a media rendering device), the dimming profiles may be based thereon by, for example, setting the dimming profiles for lighting units configured to emit white light such that they dim more with respect to lighting units configured to emit colored light. If the function of the light scene is to provide functional lighting (e.g. reading lighting or task lighting), the dimming profiles may be based thereon by, for example, setting the dimming profiles for lighting units configured to emit white light such that they dim less with respect to lighting units configured to emit colored light.

If the function of the light scene is to provide ambient lighting, the second dimming profile may have a steeper dimming curve (for at least a part of the curve) than the first dimming profile. The processor 106 may be configured to control the lighting units 112, 114 based on the dimming command, such that the light output of the second lighting unit 114 reduces relatively more with respect to the light output of the first lighting unit 112. Alternatively, the function of the light scene may be to provide functional lighting, and the first dimming profile may have a steeper dimming curve (for at least a part of the curve) than the second dimming profile. The processor 106 may be configured to control the lighting units 112, 114 based on the dimming command, such that the light output of the first lighting unit 112 reduces relatively more with respect to the light output of the second lighting unit 114.

Figure 2A:
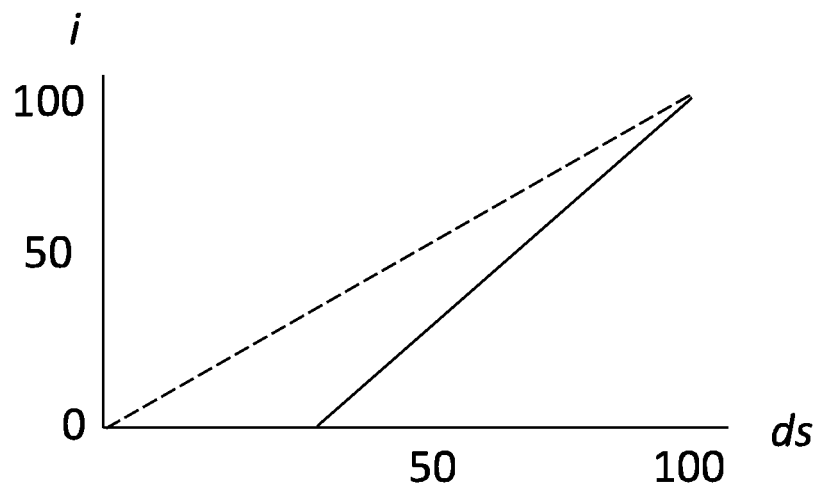
FIGS. 2a, 2b and 2c illustrate examples of dimming profiles for lighting units with different functions.
Figure 2B:
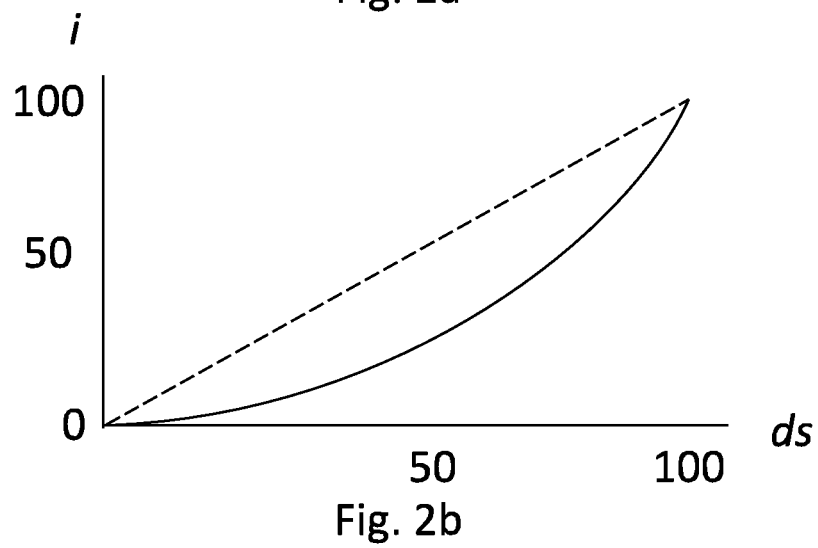
Figure 2C:
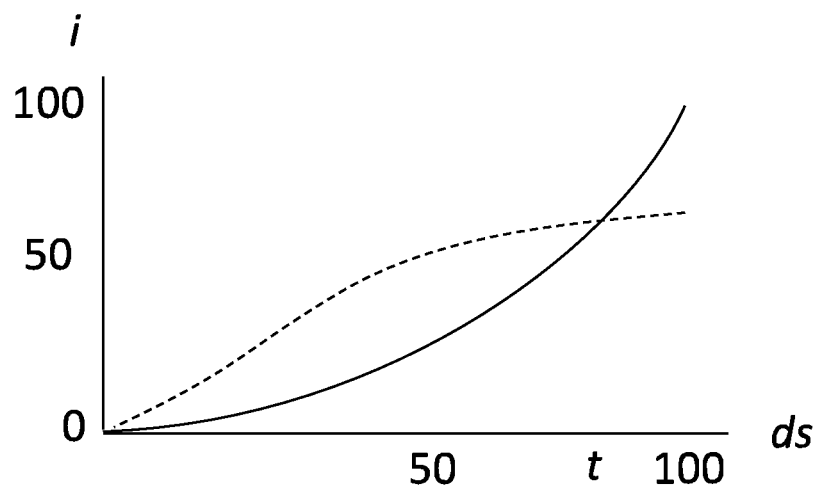

FIGS. 2a-2c illustrate examples of dimming profiles. Each dimming profile may be indicative of correlations between light intensity levels and dimming settings (which may be determined based on the dimming command). In FIGS. 2a-2c, the dotted lines indicate first dimming profiles, and the solid lines indicate second dimming profiles. It should be understood that in other examples the dotted lines may indicate second dimming profiles, and the solid lines may indicate first dimming profiles. The dimming setting ds has been mapped on the horizontal axis (e.g. form 0-100, which may be (absolute) dimming values), and the light intensity i has been mapped on the vertical axis (e.g. form 0-100%, wherein 0 is off). When the controller 102 receives the dimming command for dimming the lighting units 112, 114 (e.g. from 100 ds to 50 ds), the processor 106 may control the first lighting unit 112 according to the first dimming profile (the dotted line in FIGS. 2a and 2b), and control second lighting unit 114 according to the first dimming profile (the solid line in FIGS. 2a and 2b). As a result, the first lighting unit 112 has a higher light intensity compared to the second lighting unit 114.

In the example of FIG. 2a, the dimming profiles are linear. In this example, the second profile is such that the second lighting unit 114 would be dimmed completely (i.e. turned off, or zero intensity i) for any dim setting ds below approximately 35. In the example of FIG. 2b, the second dimming profile is non-linear. In this example, the second lighting unit 114 would emit light with a lower intensity i compared to the first lighting unit 112. FIG. 2c illustrates two other dimming profiles. The dimming profiles are such that the intensity of the second lighting unit 114 is lower than the intensity of the first lighting unit 112 for a first part of the dimming profiles, and the intensity of the second lighting unit 114 is higher than the intensity of the first lighting unit 112 for a second part of the dimming profiles for dimming settings above a threshold value t. Thus, if the dimming setting exceeds a threshold value t (e.g. approximately 80 ds in FIG. 2c), the second lighting unit 114 will emit light with a higher intensity than the first lighting unit 112.

Figure 3:
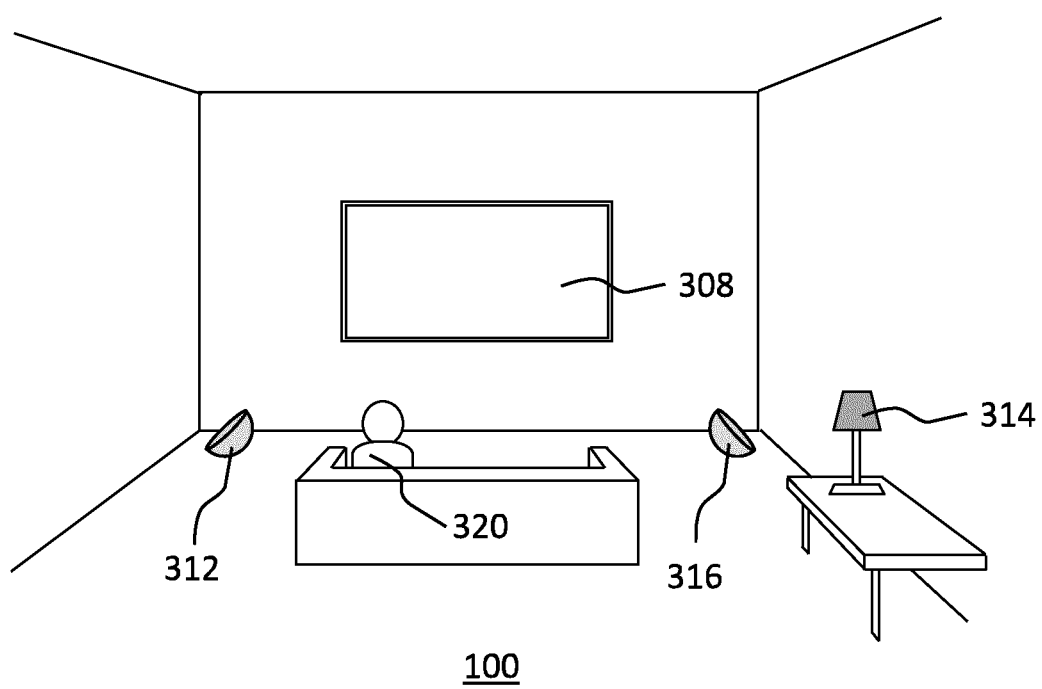
FIG. 3 illustrates an environment comprising a lighting system.
Figure 4:
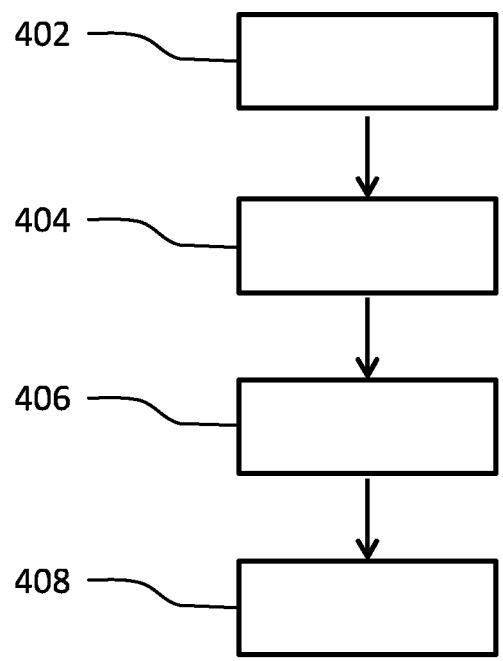
FIG. 4 shows schematically a method of controlling a plurality of lighting units according to dimming profiles.

FIG. 3 illustrates an example of a lighting system 100 comprising three lighting units 312, 314, 316, a media rendering device 308 (a TV) and a user 320. The processor 106 (not shown) of the controller 102 (not shown) may control the lighting units 312, 314, 316 according to dimming profiles based on their function. In this example, lighting units 312 and 316 (e.g. wall washers) are configured to emit ambient light (e.g. colored light that matches colors on the display of the media rendering device 308), and lighting unit 314 (e.g. a table lamp) is configured to emit functional light (e.g. reading light). If the user 320 would want to reduce the intensity of the lighting units, lighting units 312 and 316 are controlled according to a first dimming profile, and lighting unit 314 is controlled according to a second profile, for example according to the dimming profiles shown in FIGS. 2a-2c.

The lighting units 112, 114 may be controlled by communicating (e.g. via the communication module 104) lighting control instructions indicative of light intensity levels to the lighting units 112, 114. The one or more lighting units 112, 114 may be any type of lighting units 112, 114 arranged for receiving lighting control instructions. The one or more lighting units 112, 114 may comprise inputs configured to receive lighting control instructions (which may be indicative of light settings) from the controller 102, either directly or via an intermediary device. The lighting units 112, 114 may comprise one or more light sources (e.g. LED/OLED light sources). The lighting units 112, 114 may be arranged for providing general lighting, task lighting, ambient lighting, atmosphere lighting, accent lighting, indoor lighting, outdoor lighting, etc. The lighting units 112, 114 may be installed in a luminaire or in a lighting fixture. The lighting units 112, 114 may be addressable light sources of a luminaire (e.g. a light source array, an LED strip, etc.). The lighting units 112, 114 may be portable lighting units (e.g. a hand-sized device, such as an LED cube, an LED sphere, an object/animal shaped lighting unit, etc.) or wearable lighting units (e.g. a light bracelet, a light necklace, etc.).

The respective functions of the lighting units may be defined by the light rendering capabilities of the respective lighting units. The light rendering capabilities may be received by the processor 106 (e.g. via the communication unit 104 from the lighting units 112, 114, from a central (home) control system, etc.), and the functions of the lighting units 112, 114 may be determined based thereon. The first lighting unit 112 may, for example, comprise light sources configured to emit colored light, whereas the second lighting unit 114 may comprise light sources configured to emit white light or white light with different color temperatures. Based thereon, the processor 106 may determine the that the first lighting unit 112 has an ambient function and the second lighting unit 114 has a functional function.

The light scene may have been selected based on a detected user activity. The user activity (e.g. watching tv, dining, reading, working, listening to music, etc.) may be determined based on sensor data from one or more sensors (e.g. cameras, motion sensors, audio sensors, etc.). Activity detection is known in the art and will therefore not be discussed in detail. The selected light scene, and therewith its function, may thus be based on what the user is doing. Consequently, the dimming profiles of the lighting units 112, 114 are based on the user's activity.

The first and second dimming profiles may be based on positions of the first and second lighting units 112, 114 relative to a device, such as a media rendering device. The lighting units 121, 114 may be controlled based on media content (e.g. video, audio) that is being rendered on the media rendering device. The light scene may be a light script comprising lighting control instructions that correspond to the media content. The user may desire to dim the light output of the light scene, and provide the dimming command (e.g. via a light switch or a personal device such as a smartphone). The processor 106 may be configured to determine the dimming profiles based on positions of the lighting units 112, 114 relative to the media rendering device (e.g. a tv, a smartphone, an audio system, etc.). If, for example, a first lighting unit is located closer to the media rendering device than a second lighting unit (see for example FIG. 3, wherein lighting units 312 and 316 are located closer to the media rendering device 308 compared to lighting unit 314), the dimming profiles for the lighting units may be determined such that when the lighting units are controlled based on the dimming command, the intensity of the light output of the second lighting unit further away from the media rendering device reduces relatively more with respect to the intensity of the light output of the first lighting unit. The position of the media rendering device and the lighting units 112, 114 may, for example, be obtained from an (indoor) positioning system (e.g. an RF based indoor positioning system, a VLC based indoor positioning system, etc.). The dimming profiles may be determined (by the processor 106) as a function of the distance between the respective lighting units and the media rendering device. If, for example, the distance between a lighting unit and the media rendering device is smaller, the dimming curve may be steeper, whereas if the distance between a lighting unit and the media rendering device is larger, the dimming curve may be less steep (or vice versa).

The first and second dimming profiles may be based on positions of the first and second lighting units 112, 114 relative to a position of a user. The processor 106 may be configured to determine the dimming profiles based on positions of the lighting units 112, 114 relative to the user (or relative to a device carried by the user). If, for example, a first lighting unit is located closer to the user than a second lighting unit (see for example FIG. 3, wherein lighting units 312 and 316 are located closer to the user 320 compared to lighting unit 314), the dimming profiles for the lighting units may be determined such that when the lighting units are controlled based on the dimming command, the light output (intensity) of the second lighting unit further away from the user reduces relatively more with respect to the light output of the first lighting unit. The position of the user (or a device carried by the user) and the lighting units 112, 114 may, for example, be obtained from an (indoor) positioning system (e.g. an RF based indoor positioning system, a VLC based indoor positioning system, etc.). The dimming profiles may be determined (by the processor 106) as a function of the distance between the respective lighting units and the user. If, for example, the distance between a lighting unit and the user is smaller, the dimming curve may be steeper, whereas if the distance between a lighting unit and the device is larger, the dimming curve may be less steep (or vice versa).

FIG. 400 discloses a method of controlling a plurality of lighting units of a lighting system, the method 400 comprising:
 receiving 402 a first input indicative of that a light scene of a first type has been activated,
 receiving 404 a second input indicative of a dimming command for the plurality of lighting units,
 obtaining 406 data indicative of functions of the plurality of lighting units, wherein a first lighting unit has a first function to provide ambient lighting and a second lighting unit has a second function to provide functional lighting, and, if the light scene of the first type is active,
 controlling 408 the first lighting unit based on the dimming command according to a first dimming profile, wherein the first dimming profile for the first lighting unit is based on the first function, and simultaneously
 controlling 408 the second lighting unit based on the dimming command according to a second dimming profile different from the first profile, wherein the second dimming profile for the second lighting unit is based on the second function.

The method 400 may be executed by computer program code of a computer program product when the computer program product is run on a processing unit of a computing device, such as the processor 106 of the controller 102.

It should be noted that the above-mentioned embodiments illustrate rather than limit the invention, and that those skilled in the art will be able to design many alternative embodiments without departing from the scope of the appended claims.

In the claims, any reference signs placed between parentheses shall not be construed as limiting the claim. Use of the verb "comprise" and its conjugations does not exclude the presence of elements or steps other than those stated in a claim. The article "a" or "an" preceding an element does not exclude the presence of a plurality of such elements. The invention may be implemented by means of hardware comprising several distinct elements, and by means of a suitably programmed computer or processing unit. In the device claim enumerating several means, several of these means may be embodied by one and the same item of hardware. The mere fact that certain measures are recited in mutually different dependent claims does not indicate that a combination of these measures cannot be used to advantage.

Aspects of the invention may be implemented in a computer program product, which may be a collection of computer program instructions stored on a computer readable storage device which may be executed by a computer. The instructions of the present invention may be in any interpretable or executable code mechanism, including but not limited to scripts, interpretable programs, dynamic link libraries (DLLs) or Java classes. The instructions can be provided as complete executable programs, partial executable programs, as modifications to existing programs (e.g. updates) or extensions for existing programs (e.g. plugins). Moreover, parts of the processing of the present invention may be distributed over multiple computers or processors or even the 'cloud'.

Storage media suitable for storing computer program instructions include all forms of nonvolatile memory, including but not limited to EPROM, EEPROM and flash memory devices, magnetic disks such as the internal and external hard disk drives, removable disks and CD-ROM disks. The computer program product may be distributed on such a storage medium, or may be offered for download through HTTP, FTP, email or through a server connected to a network such as the Internet.

The invention claimed is:

1. A method of controlling a plurality of lighting units of a lighting system, the method comprising:
   receiving a first input indicative of that a light scene of a first type has been activated,
   receiving a second input indicative of a dimming command for the plurality of lighting units,
   obtaining data, from a memory, indicative of functions of the plurality of lighting units, wherein a first lighting unit has a first function to provide ambient lighting and a second lighting unit has a second function to provide functional lighting, and, if the light scene of the first type is still active,
   controlling the first lighting unit based on the dimming command according to a first dimming profile, wherein the first dimming profile for the first lighting unit is based on the first function, and simultaneously
   controlling the second lighting unit based on the dimming command according to a second dimming profile different from the first profile, wherein the second dimming profile for the second lighting unit is based on the second function,
   wherein the method further comprises, if a different light scene of a second type is active:
   controlling the first and second lighting units simultaneously based on the dimming command according to a third dimming profile.

2. The method of claim 1, wherein the method comprises:
   determining the first and second dimming profiles based on a function of the light scene.

3. The method of claim 2, wherein, when the function of the light scene is to provide ambient lighting, the second dimming profile has a steeper dimming curve than the first dimming profile.

4. The method of claim 2, wherein, when the function of the light scene is to provide functional lighting, the first dimming profile has a steeper dimming curve than the second dimming profile.

5. The method of claim 1, wherein the first and second dimming profiles are dimming profiles wherein the intensity of the second lighting unit is lower than the intensity of the first lighting unit for a first part of the dimming profiles for dimming settings below a threshold value, and the intensity of the second lighting unit is higher than the intensity of the first lighting unit for a second part of the dimming profiles for dimming settings above the threshold value, or vice versa.

6. The method of claim 1, wherein the second input is indicative of a user input received via a user input device.

7. The method of claim 1, wherein the respective functions of the lighting units are defined by the light rendering capabilities of the respective lighting units.

8. The method of claim 1, wherein the respective functions of the lighting units are defined by the light scene.

9. The method of claim 1, wherein the light scene has been selected based on a detected user activity.

10. The method of claim 1, wherein the method comprises:
    determining the first and second dimming profiles based on positions of the first and second lighting units.

11. The method of claim 10, wherein the first and second dimming profiles are determined based on positions of the first and second lighting units relative to a media rendering device.

12. The method of claim 10 or 11, wherein the first and second dimming profiles are determined based on positions of the first and second lighting units relative to a user.

13. A non-transitory computer readable medium comprising a computer program product for a computing device, the computer program product comprising computer program code to perform the method of claim 1 when the computer program product is run on a processing unit of the computing device.

14. A controller circuit for controlling a plurality of lighting units of a lighting system, the controller circuit comprising:
    a communication module configured to receive a first input indicative of that a light scene of a first type has been activated, and receive a second input indicative of a dimming command for the plurality of lighting units,
    a processor configured to obtain, from a memory, data indicative of functions of the plurality of lighting units, wherein a first lighting unit has a first function to provide ambient lighting and a second lighting unit has a second function to provide functional lighting, and, if the light scene of the first type is still active, control the first lighting unit based on the dimming command according to a first dimming profile, wherein the first dimming profile for the first lighting unit is based on the first function and simultaneously control the second lighting unit based on the diming command according to a second dimming profile different from the first profile, wherein the second dimming profile for the second lighting unit is based on the second function, wherein the processor is further configured to, if a different light scene of a second type is active, control the first and second lighting units simultaneously based on the dimming command according to a third dimming profile.

* * * * *